US012037296B2

(12) United States Patent
Xiao et al.

(10) Patent No.: US 12,037,296 B2
(45) Date of Patent: Jul. 16, 2024

(54) METHOD FOR MANUFACTURING CERAMIC TILES DECORATED WITH DRY PARTICLES TO GIVE THREE-DIMENSIONAL PATTERNS

(71) Applicants: JIANGXI HEMEI CERAMICS CO., LTD., Jiangxi (CN); GUANGDONG JIAMEI CERAMICS CO., LTD., Guangdong (CN); DONGGUAN CITY WONDERFUL CERAMICS INDUSTRIAL PARK CO., LTD., Guangdong (CN)

(72) Inventors: Huiyin Xiao, Guangdong (CN); Yongqiang Wang, Guangdong (CN); Rensong Liu, Guangdong (CN); Zhanwen Gu, Guangdong (CN); Yuan Ban, Guangdong (CN); Ruifeng Wang, Guangdong (CN); Qingyuan Li, Guangdong (CN); Jianchuan Liu, Guangdong (CN); Xiaoxin Lin, Guangdong (CN)

(73) Assignees: JIANGXI HEMEI CERAMICS CO., LTD., Yichun (CN); GUANGDONG JIAMEI CERAMICS CO., LTD., Qingyuan (CN); DONGGUAN CITY WONDERFUL CERAMICS INDUSTRIAL PARK CO., LTD., Dongguan (CN)

(*) Notice: Subject to any disclaimer, the term of this patent is extended or adjusted under 35 U.S.C. 154(b) by 437 days.

(21) Appl. No.: 17/355,482

(22) Filed: Jun. 23, 2021

(65) Prior Publication Data

US 2022/0356124 A1 Nov. 10, 2022

Related U.S. Application Data

(63) Continuation-in-part of application No. PCT/CN2019/092695, filed on Jun. 25, 2019.

(30) Foreign Application Priority Data

Mar. 1, 2019 (CN) .......................... 201910157415.2

(51) Int. Cl.
*C04B 41/86* (2006.01)
*B28B 11/04* (2006.01)
(Continued)

(52) U.S. Cl.
CPC ............ *C04B 41/522* (2013.01); *B28B 11/04* (2013.01); *B28B 11/243* (2013.01); *C03C 3/087* (2013.01);
(Continued)

(58) Field of Classification Search
CPC . C04B 41/86; C04B 41/0072; C04B 41/4543; C04B 41/5307; C04B 41/89; C04B 41/522; B28B 11/243; C03C 8/04
See application file for complete search history.

(56) References Cited

U.S. PATENT DOCUMENTS

2005/0221114 A1* 10/2005 Watts ...................... C04B 41/52
428/688

FOREIGN PATENT DOCUMENTS

CN 101905965 A * 12/2010
CN 101066890 A * 7/2011
(Continued)

OTHER PUBLICATIONS

Test methods of ceramic tiles—Part 7: Determination of resistance to surface abrasion for glazed tiles, National Standards of the People's Republic of China, Apr. 25, 2016, pp. 1-7, GB/T 3810.7-2016, corresponding to ISO 10545-7:1996.
(Continued)

*Primary Examiner* — Nathan H Empie

(57) ABSTRACT

The present disclosure relates to a ceramic tile decorated with dry particles to give a three-dimensional pattern and a
(Continued)

manufacturing method thereof. The manufacturing method comprises the steps of A: glazing a surface of a green body with a ground coat; B: decorating a surface of the ground coat of the green body to form a pattern; C: drying the green body; D: embellishing the green body with dry particles; E: spraying a protective glaze on the surface of the green body; and F: firing the green body after the green body is sprayed with the protective glaze of step E to produce the ceramic tile decorated with dry particles. The manufacturing method can make the ceramic tile produced have a clear pattern, distinct layers, low glaze glossiness, a good non-slip effect, an obvious sense of dry particles, a strong three-dimensional effect, rich colors, and stable properties.

4 Claims, 2 Drawing Sheets

(51) Int. Cl.
 B28B 11/24 (2006.01)
 C03C 3/087 (2006.01)
 C03C 8/04 (2006.01)
 C04B 41/00 (2006.01)
 C04B 41/45 (2006.01)
 C04B 41/50 (2006.01)
 C04B 41/52 (2006.01)
 C04B 41/89 (2006.01)
 E04F 13/14 (2006.01)

(52) U.S. Cl.
 CPC ............ *C03C 8/04* (2013.01); *C04B 41/0072* (2013.01); *C04B 41/4543* (2013.01); *C04B 41/5022* (2013.01); *C04B 41/86* (2013.01); *C04B 41/89* (2013.01); *E04F 13/142* (2013.01); *C03C 2209/00* (2013.01)

(56) References Cited

FOREIGN PATENT DOCUMENTS

| CN | 102515703 A | 6/2012 | | |
|---|---|---|---|---|
| CN | 107540344 A | 1/2018 | | |
| CN | 107685383 A | 2/2018 | | |
| CN | 108727037 A | 11/2018 | | |
| CN | 109053226 A | * | 12/2018 | ............... C03C 8/00 |
| JP | 03261684 A | * | 11/1991 | |
| JP | 2817332 B2 | * | 10/1998 | |

OTHER PUBLICATIONS

Paints and varnishes—Cross cut test for films, National Standards of the People's Republic of China, Nov. 4, 1998, pp. 1-7, GB/T 9286-1998, corresponding to ISO 2409: 1992.

International Search Report of PCT Patent Application No. PCT/CN2019/092695 issued on Nov. 28, 2019.

\* cited by examiner

METHOD FOR MANUFACTURING CERAMIC TILES DECORATED WITH DRY PARTICLES TO GIVE THREE-DIMENSIONAL PATTERNS

CROSS-REFERENCE TO RELATED APPLICATIONS

The present application is Continuation-in-Part application of PCT patent application No. PCT/CN2019/092695 filed on Jun. 25, 2019, which claims the benefit of Chinese patent application No. 201910157415.2 filed on Mar. 1, 2019. The contents of all the above are hereby incorporated by reference.

TECHNICAL FIELD

The present disclosure relates to the field of ceramic tiles, in particular, to a ceramic tile decorated with dry particles to give a three-dimensional pattern and a manufacturing method thereof.

BACKGROUND

With the improvement of people's living standards, quality and aesthetic requirements of ceramic tiles in selection of the decoration and decoration materials have enhanced significantly. At the same time, with the development of society and the progress of science and technology, the application of the ceramic inkjet technology in the ceramic field is increasing day by day, making surface effects of the ceramic tiles on the market more and more abundant.

Current ceramic inkjet technology uses a combination of glue and dry particles to apply the dry particles after the inkjet, and the glue is applied to parts where the dry particles need to be applied. Then, the dry particles are applied on a surface of a ceramic tile, the dry particles that are not held by the glue are removed, and the dry particles held by the glue are left. After firing, the ceramic tile with rich surface effects is produced.

However, there are still many defects in current processes, such as inkjet, sizing, and dry particle application, which make surface three-dimensional effects of the ceramic tiles not obvious, and production efficiency low:

(1) the inkjet pattern decoration and gluing are integrated, the gluing is performed after the inkjet pattern, then the pattern is likely to be blurred when the color of a product is relatively dark and the pattern decoration requires a large amount of inkjet ink;

(2) the inkjet pattern decoration, gluing and dry particle distribution are integrated, a large amount of dust is generated when the dry particles are dropping down, which will affect normal operation of the nozzle of the inkjet equipment, even block or damage the nozzle, and reduce the service life of the production equipment;

(3) at present, a kiln is used to suction away the dry particles that are not held by the glue, a negative pressure is formed by rotating a fan inside the kiln to absorb the dry particles that are not held by the glue, but these dry particles are easy to adhere to a wall and roof of the kiln; when the kiln is applied to the production of other types of products, it will cause defects such as ash contamination, limestone caves, and pinholes on glazes of the products, and it needs to spend manpower and material resources to remove the dry particles on the wall and roof of the kiln;

When the green body with the dry particles is fired in the kiln, the glue has not completely volatilized and solidified, the glaze and the dry particles have not yet begun to melt to produce a melt, and the dry particles on the surface of the green body are blown away or suctioned away by a fan in the kiln. This greatly reduces the amount of the dry particles on the glaze of the product, even makes no dry particle on the glaze, and makes the surface three-dimensional effect of the finished ceramic tile inapparent. At the same time, the kiln will also generate a phenomenon of ash contamination, which reduces the quality of the finished ceramic tile.

SUMMARY OF THE DISCLOSURE

In order to overcome shortcomings and deficiencies in the prior art, the objective of the present disclosure is to provide a method for manufacturing a ceramic tile decorated with dry particles to give a three-dimensional pattern. The manufacturing method has simple operation steps, convenient control, high production efficiency, and low production costs. It can make the ceramic tile produced have a clear pattern, distinct layers, low glaze glossiness, a good non-slip effect, an obvious sense of dry particles, a strong three-dimensional effect, rich colors, stable physical and chemical properties, and a wide range of temperature adaptation. This method can be applied to industrialized large-scale production. Another objective of the present disclosure is to provide a ceramic tile decorated with dry particles to give a three-dimensional pattern. The ceramic tile has a clear pattern, distinct layers, low glaze glossiness, a good non-slip effect, an obvious sense of dry particles, a strong three-dimensional effect, rich colors, and stable physical and chemical properties.

Another objective of the present disclosure is to provide a ceramic tile decorated with dry particles to give a three-dimensional pattern. The ceramic tile decorated with the dry particles has a clear pattern, distinct layers, an obvious sense of dry particles, and a strong three-dimensional effect; it achieves an effect of a concave and convex mold surface on the flat green body. The ceramic tile decorated with the dry particles has low glaze glossiness, a good non-slip effect, rich colors, and stable physical and chemical properties. The ceramic tile can be suitable for industrialized large-scale production.

The objective of the present disclosure is achieved through the following technical solution: a method for manufacturing a ceramic tile decorated with dry particles to give a three-dimensional pattern, wherein the method comprises the steps of A: glazing a surface of a green body with a ground coat;

B: maintaining a temperature of the green body at 40-60° C. after the green body is glazed with the ground coat of step A; then, decorating a surface of the ground coat of the green body to form a pattern;

C: drying the green body after the green body is decorated with the pattern of step B;

D: embellishing the green body with dry particles by spreading the dry particles on the surface of the green body after the drying of step C;

E: spraying a protective glaze on the surface of the green body after embellished with the dry particles of step D; and F: firing the green body after the green body is sprayed with the protective glaze of step E to produce the ceramic tile decorated with dry particles.

The present disclosure prepares the ceramic tile decorated with the dry particles by adopting the steps above, which have simple operation steps, convenient control, high production efficiency, and low production costs. They can make the ceramic tile produced have a clear pattern, distinct layers, low glaze glossiness, a good non-slip effect, an obvious sense of dry particles, a strong three-dimensional effect, rich colors, stable physical and chemical properties, and a wide range of temperature adaptation. These steps can be applied to industrialized large-scale production. Preferably, before step A, the green body is decorated with line textures by means of a digital material distribution method using mechanical arms, wherein, the line textures of the green body can be consistent with textures of the subsequent pattern decoration.

In step A of the present disclosure, the green body is glazed with the ground coat first, which can play a role of underpainting and whitening on the green body, so that pattern lines are clearer when a subsequent inkjet treatment is performed. This can also form a stable bonding layer of the green body and glaze, so that after spreading the dry particles and firing, the surface of the green body forms an obvious sense of sand and has a strong three-dimensional effect.

Step B carries out a pattern decoration, which can improve the pattern decoration effect of the ceramic tile, so that the ceramic tile produced has a clear pattern and distinct layers; and pattern textures of the pattern decoration can be consistent with the line textures of the green body. Preferably, the silk screen, rubber cot, inkjet printing and other ways are used for the pattern decoration. Further preferably, for inkjet printing decoration, ink is installed on the decoration equipment of inkjet printing, color of the ink can be blue, red-brown, black-brown, orange, praseodymium yellow, lemon yellow, scarlet, dark golden, black, bright, white, etc. The inkjet printing is carried out according to actual decorative patterns. In addition, preferably, a total ink volume of the inkjet printing is less than 240 pL. If the total volume of the ink is above 240 pL, the product pattern will be darker, and the pattern will tend to be blurred. At the same time, the ink with a larger amount is likely to cause the separation of water and oil during the subsequent spraying of the protective glaze, which is easy to generate a phenomenon of avoiding the glaze, and affects the quality of the product. While in the pattern decoration, the temperature of the green body is maintained at 40-60° C., at this time, there is no obvious evaporation of water vapor on the glaze of the green body, so the pattern decoration is carried out. If the glaze of the green body has obvious water vapor volatilization, the phenomena of sticking net, dripping ink, pulling lines, etc. will occur during the pattern decoration, which will reduce the quality of the product.

Thereafter, in step C, the pattern-decorated green body is dried first, so that the ink can be fully dried and formed. This prevents the subsequent spreading of the dry particles from causing fuzzy and chaotic pattern ink to undried ink, avoids blurring the pattern, and avoids reducing the clarity of the pattern of the product. Preferably, the first drying adopts hot air drying or infrared wave drying, wherein the hot air drying can use the preheating of the calcining kiln or eco-friendly natural gas as a heat source for drying, the temperature is maintained at 120-150° C., and the length of the kiln used is preferably 15-20 meters. The infrared wave drying adopts the eco-friendly natural gas, and the equipment length for the infrared wave drying is preferably 8-15 meters. Preferably, the distance between the drying equipment and the pattern decoration equipment is more than 3 meters, so that the pattern ink is fully attached to the bonding layer of the green body and the glaze. If the distance is less than 3 meters, it will dry too quickly. This causes the ink to form agglomerates as a result of its surface tension, reduces the adhesion of the ink on the glaze, makes the pattern easy to be scraped off, and affects the quality of the product.

In step D, the dry particles can be spread directly on the surface of the dried green body. This can reduce processes of spraying the glue and absorbing the dry particles during the production process, prevents the dry particles that are partially adhered to the glue from being blown off or suctioned off during the kiln firing process after spraying the glue, and avoids causing the dry particles to adhere to the kiln wall or roof, resulting in ash contamination, limestone caves, pinholes, etc. Step D simplifies the process flow, reduces the difficulty of production control, has simple operation, and reduces production costs. More preferably, the dry particles are directly spread on the pattern-decorated surface of the green body using the dry particle equipment of belt rollers or the dry particle equipment of distributing materials by mechanical arms.

Preferably, in the process of spreading the dry particles directly after the green body is dried, a quantity of the dry particles spread is 60-600 g/m$^2$, and a particle size of the dry particles is 80-250 mesh.

By strictly controlling the amount of the dry particles in the process of directly spreading the dry particles, the disclosure can increase the amount of the dry particles adhered to the glaze of the green body, and improve a three-dimensional dry particle effect of the ceramic tile. If the amount of the dry particles spread is less, the distribution degree of the dry particles on the glaze of the green body is reduced, and the three-dimensional dry particle effect of the ceramic tile is reduced. If the amount of the dry particles spread is too much, the uniformity of the dry particles spread will be reduced, and dust will be easily generated, which will affect the work of other inkjet devices. And there will be an excessive amount of the dry particles that are not held by the glue, which increases the workload of subsequent absorption of the dry particles and reduces production efficiency. Furthermore, it is easy to cause that the dry particles, which are not held by the glue, are not completely suctioned away and are fired continually during the firing process. This leads to the problem of part of the dry particles falling off in the molded product, which affects the quality of the product. Preferably, the shape of the dry particles is mainly irregular particle type, round bead type, etc. The dry particles can be selected according to the needs of the ceramic tile. High temperature dry particles, medium temperature dry particles or low temperature dry particles can be selected according to the temperature resistance. According to the color effect, you can choose transparent dry particles, red brown dry particles, white goose dry particles, black dry particles, bright dry particles, etc. According to the actual need of the hand feeling effect, the matching of dry particles at different temperatures is carried out. At the same time, different dry particle distributing devices with mechanical arms are selected for spreading and deploying according to the color of the product pattern.

In step E, by spraying the protective glaze on the surface of the green body after the dry particles are spread, it can ensure that the dry particles are not blown off or suctioned off during the firing process of the kiln, and the dry particles are protected. This can also improve the adhesion of the dry particles on the surface of the green body, and avoid suctioning off the dry particles and causing the dry particles to adhere to the kiln wall or roof, thereby preventing the product from ash contamination, limestone caves, pinholes, etc. Preferably, the protective glaze is sprayed with a high-pressure spray gun, and it is preferable to use 4-6 high-pressure spray guns for spraying to ensure the comprehensiveness and uniformity of the spraying; further preferably, the spraying pressure of the high-pressure spray gun is 10-20 bar, the nozzle diameter of the high-pressure spray gun is 0.28-0.32 mm, and the spray angle of the nozzle of the high-pressure spray gun is 90-120°. Preferably, the height between the nozzle of the high-pres sure spray gun and the brick surface is at least 70 cm. This can ensure the uniformity of the spraying, avoid the high pressure washing away the adhering dry particles, improve the degree of protection and adhesion of the green body and the dry particles, and make the dry particles not easy to fall off. If the height between the nozzle and the brick surface is too small, the pressure sprayed by the nozzle will easily wash away or blow away the adhered dry particles, which will affect the three-dimensional sense of sand and the quality of the product.

Preferably, the ground coat of step A comprises the following chemical components:

| | | | | | | | |
|---|---|---|---|---|---|---|---|
| $SiO_2$ | 65-68% | $Al_2O_3$ | 18-23% | $Fe_2O_3$ | 0.10-0.15% | CaO | 1.28-1.35% |
| MgO | 0.6-0.7% | $K_2O$ | 2.0-2.8% | $Na_2O$ | 3.18-3.25% | $TiO_2$ | 0.08-0.12% |
| $ZrO_2$ | 0-2.17% | BaO | 4.80-4.90% | ZnO | 0.90-1.0%. | | |

The present disclosure uses the raw materials above as the ground coat, and strictly controls the amount of each raw material, so that the ground coat prepared has better viscosity, hardness, mechanical strength, and corrosion resistance. Furthermore, the expansion coefficient of the ground coat is reduced during the firing process, so that the ground coat and the green body are fully attached and melted to form a stable bonding layer of the green body and the glaze.

Wherein, 18-23 parts of $Al_2O_3$ are the intermediate body oxides of the ground coat network. In the process of the glaze melting, $Al_2O_3$ can usually capture free oxygen to form a four-coordinated compound to enter the silicon-oxygen network, strengthen the glass network structure, improve the hardness, mechanical strength and chemical resistance of the ground coat, reduce the expansion coefficient of the ground coat, and increase the vitrification ability. However, the excessive content of $Al_2O_3$ in the ground coat will obviously increase the refractory degree of the glaze and the viscosity of the glaze melt, and reduce the bonding stability of the bonding layer of the green body and the glaze. 1.28 to 1.35 parts of CaO are outer body oxides of the divalent network. CaO can release the free oxygen at high temperatures, destroy the network structure, make the structure tighter, increase the viscosity, reduce the viscosity of the ground coat melt, help the melting of the ground coat, accelerate the solidification of the melt, reduce the expansion coefficient of the glaze, improve the hardness, chemical stability and mechanical strength of the glaze, and promote the good combination with the green body. If the amount of CaO is too much, it will increase the refractoriness of the ground coat, precipitate tiny crystal grains during the firing of the ground coat, and reduce the transparency of the ground coat. 0.6-0.7 part of MgO is an outer body oxide of the divalent network. MgO provides free oxygen at high temperatures, increases the fluidity of the ground coat, makes it easier to coat the body, increases the bonding with the green body, increases the fluxing range, reduces the expansion coefficient of the glaze, promote the formation of the bonding layer of the green body and the glaze, reduces the tendency of the ground coat to crack, improves the shrinkage phenomenon, and increases the whiteness of the glaze. $K_2O$, $Na_2O$ and $Li_2O$ are all outer body oxides of the ground coat network; during the glaze melting process, they all have a strong "breaking network" effect, which can significantly reduce the melting temperature and viscosity of the glaze. $Li_2O$ has a better fluxing effect, and replacing sodium with lithium reduces the thermal expansion coefficient of the ground coat and improves the glossiness, chemical stability, and elasticity of the glaze. 0.90-1.0 part of ZnO can play a good role of fluxing in a large range, increase the glossiness of the glaze, increase the whiteness of the glaze, reduce the expansion coefficient, increase the refractive index, promote the opacification, reduce the shrinkage of the ground coat during the firing process, and reduce the defects such as bald glaze and blistering caused by the shrinkage of the ground coat. $ZrO_2$ can improve whiteness and wear resistance of the glaze, and can increase crack resistance and hardness of the glaze. 4.80-4.90 parts of BaO can significantly improve the fluxing property and refractive index of the ground coat, and increase the glossiness of the glaze.

Preferably, in step C, the drying of the green body after the green body is decorated with the pattern is carried out at a temperature of 120° C. to 150° C. In step E, the spraying of the protective glaze is carried out by high-pressure spraying, a pressure of the high-pressure spraying of the protective glaze is 10-20 bar, an amount of the protective glaze sprayed is 70-100 g/m². In step F, the firing is carried out at 1180-1220° C. for 60-80 min.

By decorating the ground coat on the green body, the present disclosure can fully melt and combine the ground coat and the green body, improve the stability of a formed body-glaze combination, and avoid deglazing, blistering, etc., so that after spreading the dry particles and firing, an obvious sense of sand is formed, and the three-dimensional sense is strong. Preferably, after the green body is glazed with the ground coat, the volume expansion coefficient of the green body is 220-250/° C., and the whiteness is 0-75°.

Moreover, by strictly controlling the drying temperature of the green body after the pattern decoration, the ink can be fully dried and formed. Then, the wetting agent is sprayed to avoid the miscibility of undried ink under the action of the wetting agent, or avoid the phenomenon that the subsequent spreading of the dry particles will cause fuzzy and chaotic pattern ink to the undried ink. This makes the pattern blurry and reduces the clarity of the product's pattern. If the drying temperature is too low, the ink will not dry sufficiently, which will easily cause the ink and the subsequent wetting agent to dissolve and penetrate each other, reducing the clarity of the pattern. If the drying temperature is too high, it is easy for the ink to dry too quickly, causing the ink to form agglomerates as a result of its surface tension, reducing the adhesion of the ink on the glaze surface, making the pattern easy to be scraped off, and affecting the quality of the product.

Moreover, by spraying the protective glaze by means of the high-pressure spraying and strictly controlling the spraying pressure and the spraying amount of the glaze, the protective glaze can be sprayed evenly on the surface of the dry particles. If the spraying pressure is high, the dry particles spread on the green body are easily sprayed or blown away due to the high pressure. If the spraying pressure is small, the protective glaze sprayed will be insufficiently atomized, and the spraying will be uneven. This will reduce the uniformity of the protective glaze and reduce the protective performance of the protective glaze on the surface of the ceramic tile. If the amount of the glaze sprayed is small, the protective performance of the protective glaze on the surface of the dry particles and the surface of the ceramic tile will be reduced. If the amount of the glaze sprayed is too large, it will not be easy to complete the sintering in the subsequent firing process, and it is easy to appear that the inside of the protective glaze is not fired. This reduces the stability of the protective glaze, causes the surface protective glaze of the ceramic tile to easily fall off, and reduces the protective performance of the dry particles and the surface of the ceramic tile.

By strictly controlling the final firing temperature and time, the crystal density of the protective glaze on the surface of the green body can be high, the strength of the ceramic tile surface can be improved, and scratches are not easy to occur. Furthermore, the controlling can make the dry particles melt and adhere to the green body, improve the bonding stability of the green body and the dry particles, improve the quality of the product, and make it difficult to deglaze.

Preferably, the protective glaze in step E is a matte transparent protective glaze, the matte transparent protective glaze comprises the following raw materials in parts by weight:

| | |
|---|---|
| calcined zinc oxide | 5-6 parts, |
| barium carbonate | 6-8 parts, |
| potassium feldspar | 15-20 parts, |
| a frit | 35-45 parts, |
| calcined alumina | 5-10 parts, |
| calcined talc | 10-14 parts, |
| dolomite | 1-5 parts, |
| kaolin | 6-8 parts, |
| an ultrafine quartz powder | 1-3 parts. |

By adopting the raw materials above as the protective glaze and strictly controlling the amount of each raw material, the present disclosure can ensure that the dry particles are not blown off or suctioned off during the firing process of the kiln, and the dry particles are protected. It can also improve the adhesion of the dry particles on the surface of the green body, and avoid suctioning off the dry particles and causing the dry particles to adhere to the kiln wall or roof, thereby preventing the product from ash contamination, limestone caves, pinholes, etc. Moreover, the protective glaze is matte and transparent, which will not affect the pattern effect of the green body after the pattern is decorated; it has high definition, can improve the wear resistance of the ceramic tile surface, reduce its glossiness, and have an effect of matte frosting. Preferably, the processing fineness of the protective glaze is controlled to be 0.3-0.5% remaining on the 325 mesh sieve, the specific gravity is 1.30±0.01, and the glossiness of the product formed after spraying the protective glaze and firing is 5-8.

Preferably, the frit comprises the following chemical components:

By adopting the raw materials above as the frit, the present disclosure can reduce the expansion coefficient of the protective glaze during the firing process, can discharge carbon dioxide in advance during the firing process, so as not to affect the flatness of the protective glaze, and improve the three-dimensional effect of the ceramic tile.

Preferably, in step D, another preferred dry decoration method specifically comprises steps of D1: following the drying of step C, spraying a wetting agent solution on a pattern-decorated surface of the green body;

D2: spraying glue on the pattern-decorated surface of the green body after the pattern-decorated surface is sprayed with the wetting agent solution in step D1;

D3: spreading dry particles on the surface of the green body after the pattern-decorated surface is sprayed with the glue in step D2; and D4: recycling the dry particles under suction, wherein the dry particles recycled are the dry particles that are not held by the glue during the spreading of the dry particles in step D3.

The present disclosure can form a transparent wetting film on the surface of the glaze surface of the green body by spraying the wetting agent solution on the dried body, thereby increasing the humidity of the product. Utilizing the hydrophilicity and lipophilicity of the wetting agent of the present disclosure, the subsequent glue is easier to be sprayed on the glaze, the adhesion of the glue on the glaze is improved, the phenomenon of avoiding the glaze of the oily ink and the glue on the glaze is avoided, the phenomenon of blurring in the pattern due to avoiding the glaze is avoided, and the pattern definition of the product is improved.

Preferably, in step D1, the high-pressure spray gun is used for spraying the wetting agent solution, preferably 2-4 high-pressure spray guns for spraying are adopted. The wetting agent is sprayed evenly on the surface of the pattern decoration to achieve a uniform, atomized, and transparent film layer. Further preferably, the spraying pressure of the high-pressure spray gun is 10-20 bar, the nozzle diameter of the high-pressure spray gun is 0.28-0.32 mm, and the spray angle of the nozzle of the high-pressure spray gun is 90-120°. Preferably, the distance between the high-pressure spray gun and the drying device above is more than 3 meters to ensure the formation of a uniform and transparent protective glaze film. If the distance between the two is less than 3 meters, the dried green body still has residual temperature, and the residual temperature is likely to cause part of the protective glaze film to volatilize, affecting its humidity.

In step D2, the glue is sprayed and printed after the wetting agent solution is sprayed. It is preferable to use a multi-channel digital glue spraying device to spray the glue on a large area or a local position, and to control the distance between the glue spraying device and the high-pressure spray gun for spraying the wetting agent solution within 3 meters. This can ensure the wettability of the glaze, make the glue sprayed evenly on the glaze, avoid the phenomenon of avoiding the glaze, improve the clarity of the pattern, and improve the adhesion of the subsequent dry particles spread on the glue to form a ceramic tile with stable interlayers.

| | | | | | | | |
|---|---|---|---|---|---|---|---|
| $SiO_2$ | 45.25-46.25% | $Al_2O_3$ | 19-21% | $Fe_2O_3$ | 0.05-0.10% | CaO | 2.35-2.65% |
| MgO | 0.75-1.15% | $K_2O$ | 1.8-2.0% | $Na_2O$ | 4.5-4.8% | $TiO_2$ | 0.2-0.3% |
| $B_2O_3$ | 0.04-0.08% | BaO | 15.0-15.4% | ZnO | 6.0-6.5% | SrO | 3.4-3.8%. |

This can also avoid large-area shedding of the dry particles due to insufficient glue adhesion, which will affect the quality of the product. If the distance between the glue spraying device and the high-pressure spray gun spraying the wetting agent solution is too long, the wetting agent is likely to partially volatilize. This will affect its wetting effect and reduce the adhesion of the glue on the glaze. Preferably, the amount of the glue sprayed is 25-80 g/m$^2$, the specific gravity of the glue used is 1.15-1.20, the flow rate at room temperature is 16-18 m/s, the pH value is 7.2±0.1, and the volatilization temperature is 300-400° C.

In step D3, by spreading the dry particles on the surface of the glue, the adhesive force between the dry particles and the green body is improved, and a strong three-dimensional dry particle effect is formed after firing. Wherein, preferably, the distance between the dry particle spreading device and the glue spraying device is 1-3 meters. This can ensure that the glue can fix the dry particles in time, avoid spreading dry particles to generate a large amount of dust and block or damage the nozzle, avoid affecting or causing damage to the glue spraying device and the inkjet device, and prolong the service life of the equipment. Preferably, the distance between the distributing opening of the dry particle spreading equipment and the green body is 5-10 cm. This ensures the uniformity of the dry particles spread and avoids a large amount of dust generated by spreading the dry particles that affects the work of the glue spraying equipment and the inkjet device. If the distance between the distributing opening and the green body is too small, dust is likely to be generated due to the discharge force of the distributing opening. If the distance between the distributing opening and the green body is too large, the uniformity of the dry particles spread will be reduced.

In step D4, by recycling the dry particles that have not been held by the glue, the uniformity of the dry particles spread is guaranteed, and the agglomeration, precipitation and other phenomena of the dry particles, which will affect the subsequent firing effect, are avoided. Then, by recycling the dry particles to the dry particle storage equipment, the dry particles, which have not been held by the glue, are prevented from adhering to the kiln wall or roof. This prevents the product from ash contamination, limestone caves, pinholes, etc.

In step F, by spraying the protective glaze after the dry particles that are not held by the glue are suctioned away in step D4, it can ensure that the dry particles are not blown off or suctioned off during the firing process of the kiln, and the dry particles are protected. It can also improve the adhesion of the dry particles on the surface of the green body, and avoid suctioning off the dry particles and causing the dry particles to adhere to the kiln wall or roof, thereby preventing the product from ash contamination, limestone caves, pinholes, etc. Preferably, the protective glaze is sprayed with a high-pressure spray gun, and it is preferable to use 4-6 high-pressure spray guns for spraying to ensure the comprehensiveness and uniformity of the spraying. Further preferably, the spraying pressure of the high-pressure spray gun is 10-20 bar, the nozzle diameter of the high-pressure spray gun is 0.28-0.32 mm, and the spray angle of the nozzle of the high-pressure spray gun is 90-120°. Preferably, the height between the nozzle of the high-pressure spray gun and the brick surface is at least 70 cm. This can ensure the uniformity of the spraying, avoid washing away the adhering dry particles by the high pressure, improve the degree of protection and adhesion of the green body and the dry particles, and make the dry particles not easy to fall off. If the height between the nozzle and the brick surface is too small, the pressure sprayed by the nozzle will easily wash away or blow away the dry particles adhered, which will affect the three-dimensional sense of sand and the quality of the product.

The high-pressure spray gun for spraying is adopted, preferably 2-4 high-pressure spray guns for spraying are adopted. The wetting agent is sprayed evenly on the surface of the pattern decoration to achieve a uniform, atomized, and transparent film layer. Further preferably, the spraying pressure of the high-pressure spray gun is 10-20 bar, the nozzle diameter of the high-pressure spray gun is 0.28-0.32 mm, and the spray angle of the nozzle of the high-pressure spray gun is 90-120°. Preferably, the distance between the high-pressure spray gun and the drying device above is more than 3 meters to ensure the formation of a uniform and transparent protective glaze film. If the distance between the two is less than 3 meters, the dried body still has residual temperature, and the residual temperature is likely to cause part of the protective glaze film to volatilize, affecting its distribution and adhesion.

Preferably, in step D1, the spraying of the wetting agent is carried out by high-pressure spraying, a pressure of the high-pressure spraying is 10-20 bar; wherein in step D3, a quantity of the dry particles spread is 160-600 g/m$^2$, and a particle size of the dry particles is 60-250 mesh.

By spraying the wetting agent by means of the high-pressure spraying and strictly controlling the spraying pressure, the present disclosure can atomize the wetting agent with high pressure, spray the wetting agent, and improve the uniformity of the spraying to achieve a uniform, atomized and transparent film layer. If the spraying pressure is too low, the atomization degree of the wetting agent will be reduced, and the uniformity of the wetting agent sprayed will be reduced. If the spraying pressure is too high, the pressure will easily wash away the atomized wetting agent sprayed. It will be difficult for the wetting agent to form a film on the glaze surface, and it is difficult to achieve the wetting effect.

Moreover, by strictly controlling the amount of the dry particles spread, the amount of the dry particles adhered to the glaze of the green body can be increased, and the three-dimensional dry particle effect of the ceramic tile can be improved. If the amount of the dry particles spread is less, the distribution of the dry particles on the glaze of the green body will be reduced, and the three-dimensional dry particle effect of the ceramic tile will be reduced. If the amount of the dry particles spread is too much, the uniformity of the dry particles spread will be reduced, and dust will be easily generated, which will affect the work of other inkjet equipment At the same time, there will be an excessive amount of the dry particles that are not held by the glue, which increases the workload of subsequent absorption of the dry particles and reduces production efficiency. Furthermore, it is easy to cause the dry particles that, are not held by the glue to be not completely suctioned away, and to be fired continuously during the firing process. This results in the problem of part of the dry particles falling off in the molded product, which affects the product quality. Preferably, the shape of the dry particles is mainly irregular particle type, round bead type, etc. The dry particles can be selected according to the needs of the ceramic tile. According to the temperature resistance, high dry particles, medium dry particles or low temperature dry particles can be selected. According to the color effect, you can choose transparent dry particles, red brown dry particles, white goose dry particles, black dry particles, bright dry particles, etc. According to the actual need of the hand feeling effect, the dry particles with different temperature resistance are matched, and at the same time, different types of the dry particles are selected for deployment according to the color of the product pattern.

Preferably, in step D2, the wetting agent solution is prepared by mixing an eco-friendly wetting agent and room temperature water at a weight ratio of 20-50:50-80, the eco-friendly wetting agent is a mixture of an eco-friendly wetting powder and hot water at a weight ratio of 1:7-10, the hot water is at 50-70° C.; the eco-friendly wetting powder comprises the following raw materials in parts by weight:

| | |
|---|---|
| polyvinyl alcohol | 15-30 parts, |
| acrylamide crystal | 5-10 parts, |
| sodium carboxymethylcellulose | 50-70 parts, |
| carbopol | 5-15 parts. |

The present disclosure adopts the raw materials above as the wetting agent, there is no release of formaldehyde and no pollution. The wetting agent can fully wet the glaze, increase the humidity of the glaze, promote the spray and adhesion of subsequent glue, and improve the adhesion of the glue on the glaze. Wherein, the polyvinyl alcohol used can increase the viscosity of the wetting agent, promote the uniform spraying of the wetting agent on the glaze, stick to the glue easily, and improve the adhesion between the glue and the glaze. Both acrylamide crystals and sodium carboxymethyl cellulose used can improve the viscosity and dispersion uniformity of the wetting agent.

Preferably, before step A, the green body was decorated with line textures by means of a digital material distribution method using mechanical arms; before step E, step D2 to step D4 were repeated 2-6 times.

The present disclosure can perform line texture decoration on the green body before the pattern decoration, wherein the line textures of the green body can be consistent with the textures of the subsequent pattern decoration, which can effectively improve the definition of the pattern lines. Before spraying the protective glaze, you can repeatedly spray the glue, spread the dry particles and recycle the dry particles so as to improve the three-dimensional dry particle effect of the ceramic sheet, achieve various characteristic patterns of the product with different colors of dry particles, and achieve the three-dimensional effect of colorful dry particles with rich and clear product patterns.

Another objective of the present disclosure is achieved by the following technical solution: a ceramic tile decorated with dry particles prepared by the method above, wherein the ceramic tile decorated with the dry particles comprises, from bottom to top, a green body layer, a ground coat layer, a pattern layer, a dry particle layer, and a protective glaze layer; a thickness of the ground coat layer is 0.05-0.2 mm, a thickness of the pattern layer is 0.05-0.1 mm, a thickness of the dry particle layer is 0.5-1 mm, and a thickness of the protective glaze layer is 0.02-0.03 mm.

The ceramic tile decorated with dry particles of the present disclosure is made by the steps above (ground coat decoration—pattern decoration—drying—spreading dry particles—spraying protective glaze—firing). The ceramic tile has a clear pattern, distinct layers, low glaze glossiness, a good non-slip effect, an obvious sense of dry particles, a strong three-dimensional effect, rich colors, and stable physical and chemical properties.

Another objective of the present disclosure is achieved by the following technical solution: a ceramic tile decorated with dry particles prepared by the method above, wherein the ceramic tile decorated with the dry particles comprises, from bottom to top, a green body layer, a ground coat layer, a pattern layer, a glue layer, a dry particle layer, and a protective glaze layer; a thickness of the ground coat layer is 0.05-0.2 mm, a thickness of the pattern layer is 0.05-0.1 mm, a thickness of the glue layer is 0.02-0.03 mm, a thickness of the dry particle layer is 0.5-1 mm, and a thickness of the protective glaze layer is 0.02-0.03 mm.

The ceramic tile decorated with dry particles of the present disclosure is made by the steps above (ground coat decoration—pattern decoration—drying-spraying wetting agent solution—spraying glue—spreading dry particles—recycling dry particles—spraying protective glaze—firing). The ceramic tile decorated with the dry particles has a clear pattern, distinct layers, an obvious sense of dry particles, a strong three-dimensional effect; it realizes achieves an effect of a concave and convex mold surface on the flat green body. The ceramic tile decorated with the dry particles has low glaze glossiness, a good non-slip effect, rich colors, and stable physical and chemical properties. The ceramic tile can be suitable for industrialized large-scale production.

Another preferably, the manufacturing equipment of the ceramic tile decorated with dry particles used in the method above for manufacturing the ceramic tile decorated with the dry particles to give a three-dimensional pattern comprises, according to a sequence of use, a ground coat decorating device, a pattern decorating device, a drying device, a first high-pressure glaze spraying device, a multi-channel digital glue spraying device, a dry particle distributing device, a particle suction device, a second high-pressure glaze spraying device and a firing device, the particle suction device comprises a firing output terminal and a circulation output terminal, the firing output terminal is connected to an input terminal of the firing device, the circulation output terminal is connected to an input terminal of the multi-channel digital glue spraying device, and the first high-pressure glaze spraying device and the second high-pressure glaze spraying device are both equipped with a high-pressure spray gun.

The present disclosure prepares the ceramic tile decorated with the dry particles by the manufacturing equipment above, which is easy to operate and flexible in operation. This can make the prepared ceramic tile have a clear pattern, distinct layers, low glaze glossiness, a good non-slip effect, an obvious sense of dry particles, a strong three-dimensional effect, rich colors, stable physical and chemical properties, a wide temperature adaptation range. This can be applied to industrialized large-scale production. Wherein, the first high-pressure glaze spraying device is used for spraying the wetting agent, the second high-pressure glaze spraying device is used for spraying the protective glaze, and a high-pressure spray gun is selected for spraying, which can improve the atomization degree of the wetting agent and the protective glaze after spraying, improve the uniformity of spraying, and then improve the forming stability of the wetting agent and the protective glaze. More preferably, the manufacturing equipment further includes a line texture decorating device, and the output end of the line texture decorating device is connected to the input end of the ground coat decorating device. Moreover, the manufacturing equipment is easy to operate, flexible in operation control, and high in production efficiency, which is suitable for industrialized large-scale production. It can make the prepared ceramic tile have a clear pattern, distinct layers, a good non-slip effect, an obvious sense of dry particles, a strong three-dimensional effect, and rich colors.

Preferably, the distance between the pattern decoration device and the drying device is more than 3 meters. This makes the pattern ink fully adhere to the bonding layer of the green body and the glaze, avoiding insufficient attachment of the pattern ink and self-agglomerating due to too fast drying, which in turn makes the pattern easy to be scraped off and affect the quality of the product. The distance between the drying device and the first high-pressure glaze spraying device is more than 3 meters to ensure the formation of a uniform and transparent wetting film; if the distance between the two is less than 3 meters, the dried green body still has residual temperature, and the remaining temperature is likely to cause part of the wetting film to volatilize and affect its humidity. The distance between the first high-pressure glaze spraying device and the multi-channel digital glue spraying device is within 3 meters, which can ensure the humidity of the glaze, so that the glue is sprayed on the glaze evenly, avoiding the phenomenon of avoiding the glaze, and improving the clarity of the pattern; at the same time, the subsequent adhesion of the dry particles on the glue is improved to form a ceramic tile with stable interlayers, which avoids the large area shedding of the dry particles due to insufficient glue adhesion and avoids affecting the quality of the product.

Preferably, the particle suction device comprises a dry particle suction device, a hose, and a filtering device connected in sequence, the particle suction device also includes a suction adjusting device used to adjust the suction force of the dry particles, a hot air output device used to deliver hot air to soften the glue that suctions away the surface of the dry particles, and a negative pressure vacuum device for forming a negative pressure on the particle suction device. An input terminal of the hot air output device is connected to an input terminal of a filtering device; the dry particle suction device is a fan-shaped dry particle suction device with a slit-shaped dry particle suction port.

The dry particles that are not held by the glue are suctioned away from the surface of the green body by a negative pressure produced by the negative pressure vacuum device of the particle suction device of the present disclosure, and the dry particles suctioned away are transferred to the silo where the dry particles are spread by the negative pressure vacuum. By a fan-shaped dry particle suction device with a gap in the dry particle suction port, the dry particles that are not held near the dry particle suction port can be suctioned away. This prevents excessive negative pressure from suctioning away the dry particles stuck slightly, resulting in a reduction in the amount of the dry particles and reducing the three-dimensional effect of the dry particles. Preferably, the distance between the dry particle suction port of the fan-shaped dry particle and the surface of the ceramic tile is 5-10 cm, which can effectively suction away the dry particles that are not held. If the distance between the dry particle suction port and the surface of the ceramic tile is too small, the dry particles stuck slightly are easily suctioned away by the negative pressure vacuum, reducing the three-dimensional effect of the dry particles. If the distance between the dry particle suction port and the surface of the ceramic tile is too large, it is easy to cause part of the dry particles that are not held to fail to be suctioned away, and fail to adhere to the surface of the green body after firing, resulting in the phenomenon of shedding and reducing the quality of the ceramic tile.

The manufacturing method of the ceramic tile, decorated with the dry particles to give a strong three-dimensional effect, of the present disclosure has simple operation steps, convenient control, high production efficiency, and low production costs. This method can make the prepared ceramic tile have a clear pattern, distinct layers, low glaze glossiness, a good non-slip effect, an obvious sense of dry particles, a strong three-dimensional effect, rich colors, stable physical and chemical properties, and a wide temperature adaptation range. This can be applied to industrialized large-scale production.

The ceramic tile decorated with dry particles is prepared by a direct spreading process of the dry particles; and it has a clear pattern, distinct layers, low glaze glossiness, a good non-slip effect, an obvious sense of dry particles, a strong three-dimensional effect, rich colors, and stable physical and chemical properties.

The disclosure adopts the process of spraying wetting agent solution—spraying glue—spreading dry particles—recovering dry particles to carry out the process of the dry particle decoration. The prepared ceramic tile decorated with the dry particles has a clear pattern, distinct layers, an obvious sense of dry particles, and a strong three-dimensional effect; it achieves the effect of concave and convex mold surface on the flat green body, and it has low glaze glossiness, a good non-slip effect, rich colors, and stable physical and chemical properties. The ceramic tile can be applied to industrialized large-scale production.

Figure 1:
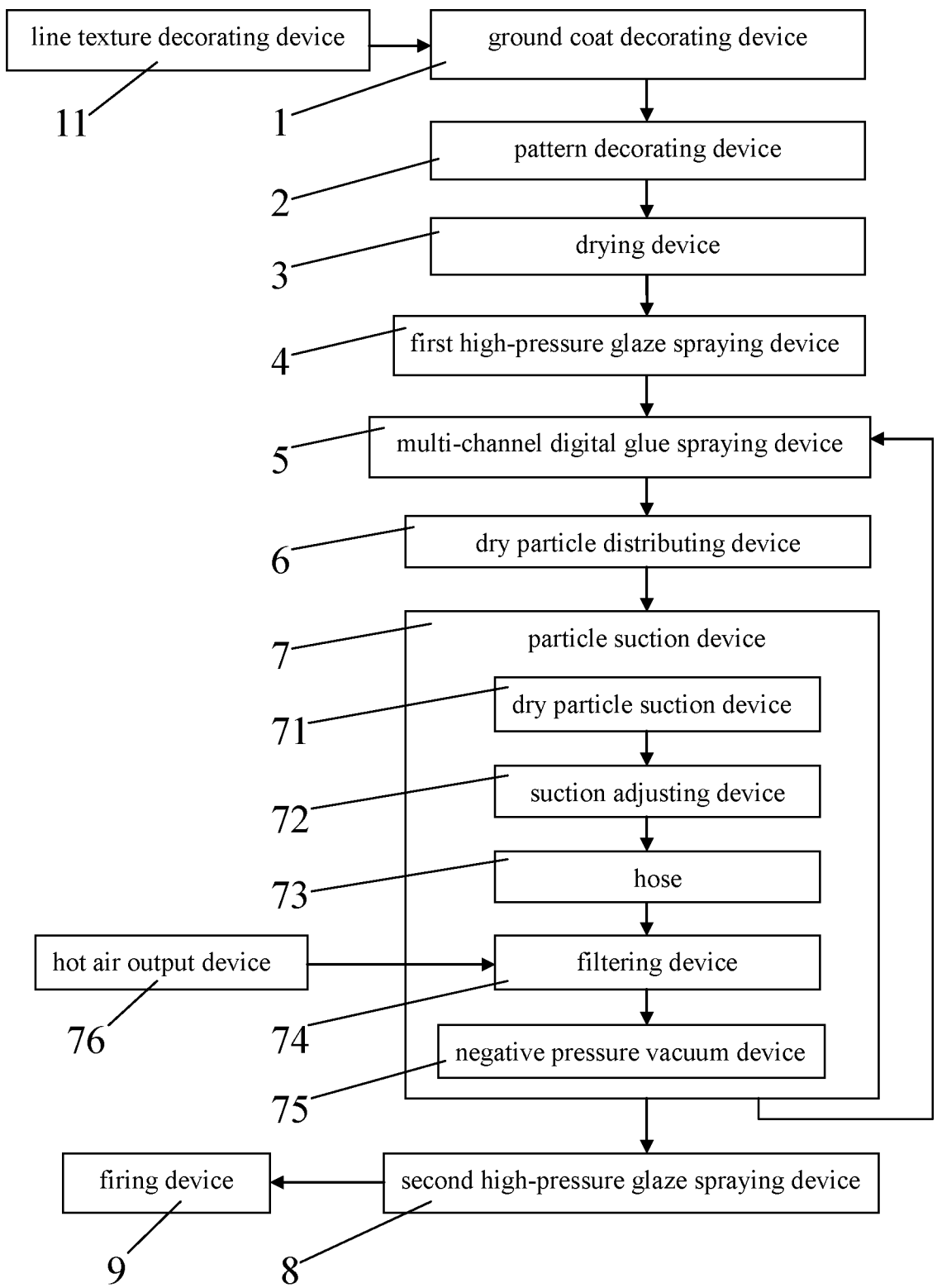
FIG. 1 is a block diagram of the manufacturing equipment for the ceramic tile decorated with dry particles of the present disclosure.

REFERENCE NUMERALS ARE AS FOLLOWS ground coat decorating device 1; line texture decorating device 11; pattern decorating device 2; drying device 3; first high-pressure glaze spraying device 4; multi-channel digital glue spraying device 5; dry particle distributing device 6; particle suction device 7; dry particle suction device 71; suction adjusting device 72; hose 73; filtering device 74; negative pressure vacuum device 75; hot air output device 76; second high-pressure glaze spraying device 8; firing device 9.

DETAILED DESCRIPTION OF PREFERRED EXAMPLES

In order to facilitate understanding of those skilled in the art, the present disclosure will be further described below through examples and drawings 1~2, and the content mentioned in the examples does not limit the present disclosure.

EXAMPLE 1

A method for manufacturing a ceramic tile decorated with dry particles to give a three-dimensional pattern, wherein the method comprised the steps of
  A: glazing a surface of a green body with a ground coat;
  B: maintaining a temperature of the green body at 40° C. after the green body was glazed with the ground coat of step A; then, decorating a surface of the ground coat of the green body to form a pattern;
  C: drying the green body after the green body was decorated with the pattern of step B;
  D: embellishing the green body with dry particles by spreading the dry particles on the surface of the green body after the drying of step C;
  E: spraying a protective glaze on the surface of the green body after embellished with the dry particles of step D; and F: firing the green body after the green body was sprayed with the protective glaze of step E to produce the ceramic tile decorated with dry particles.

Before step A, the green body was decorated with line textures by means of a digital material distribution method using mechanical arms.

In step A, the ground coat consisted of the following chemical components:

| $SiO_2$ | 65% | $Al_2O_3$ | 18.46% | $Fe_2O_3$ | 0.15% | CaO | 1.35% |
|---|---|---|---|---|---|---|---|
| MgO | 0.7% | $K_2O$ | 2.8% | $Na_2O$ | 3.35% | $TiO_2$ | 0.12% |
| $ZrO_2$ | 2.17% | BaO | 4.90% | ZnO | 1.0%. | | |

In step C, the drying of the green body after the green body was decorated with the pattern was carried out at a temperature of 120° C.; wherein in step E, the spraying of the protective glaze was carried out by high-pressure spraying, a pressure of the high-pres sure spraying of the protective glaze was 10 bar, an amount of the protective glaze sprayed was 70 g/m²; wherein in step F, the firing was carried out at 1180° C. for 80 min.

The protective glaze in step E was a matte transparent protective glaze, the matte transparent protective glaze comprised the following raw materials in parts by weight:

| calcined zinc oxide | 5 parts, |
|---|---|
| barium carbonate | 6 parts, |
| potassium feldspar | 15 parts, |
| a frit | 35 parts, |
| calcined alumina | 5 parts, |
| calcined talc | 10 parts, |
| dolomite | 1 part, |
| kaolin | 6 parts, |
| an ultrafine quartz powder | 1 part. |

The frit consisted of the following chemical components:

| $SiO_2$ | 45.25% | $Al_2O_3$ | 19% | $Fe_2O_3$ | 0.05% | CaO | 2.37% |
|---|---|---|---|---|---|---|---|
| MgO | 0.75% | $K_2O$ | 1.8% | $Na_2O$ | 4.7% | $TiO_2$ | 0.3% |
| $B_2O_3$ | 0.08% | BaO | 15.4% | ZnO | 6.5% | SrO | 3.8%. |

The ceramic tile decorated with dry particles prepared by the method above, wherein the ceramic tile decorated with the dry particles comprised, from bottom to top, a green body layer, a ground coat layer, a pattern layer, a dry particle layer, and a protective glaze layer; a thickness of the ground coat layer was 0.05-0.2 mm, a thickness of the pattern layer was 0.05-0.1 mm, a thickness of the dry particle layer was 0.5-1 mm, and a thickness of the protective glaze layer was 0.02-0.03 mm.

EXAMPLE 2

A method for manufacturing a ceramic tile decorated with dry particles to give a three-dimensional pattern, wherein the method comprised the steps of
A: glazing a surface of a green body with a ground coat;
B: maintaining a temperature of the green body at 45° C. after the green body was glazed with the ground coat of step A; then, decorating a surface of the ground coat of the green body to form a pattern;
C: drying the green body after the green body was decorated with the pattern of step B;
D: embellishing the green body with dry particles by spreading the dry particles on the surface of the green body after the drying of step C;
E: spraying a protective glaze on the surface of the green body after embellished with the dry particles of step D; and
F: firing the green body after the green body was sprayed with the protective glaze of step E to produce the ceramic tile decorated with dry particles.

Before step A, the green body was decorated with line textures by means of a digital material distribution method using mechanical arms.

In step A, the ground coat consisted of the following chemical components:

| $SiO_2$ | 66% | $Al_2O_3$ | 19.75% | $Fe_2O_3$ | 0.11% | CaO | 1.30% |
|---|---|---|---|---|---|---|---|
| MgO | 0.62% | $K_2O$ | 2.2% | $Na_2O$ | 3.19% | $TiO_2$ | 0.09% |
| $ZrO_2$ | 1.0% | BaO | 4.82% | ZnO | 0.92%. | | |

In step C, the drying of the green body after the green body was decorated with the pattern was carried out at a temperature of 130° C.; wherein in step G, the spraying of the protective glaze was carried out by high-pressure spraying, a pressure of the high-pres sure spraying of the protective glaze was 12 bar, an amount of the protective glaze sprayed was 80 g/m²; wherein in step F, the firing was carried out at 1190° C. for 65 min.

The protective glaze in step E was a matte transparent protective glaze, the matte transparent protective glaze comprised the following raw materials in parts by weight:

| calcined zinc oxide | 5.2 parts, |
|---|---|
| barium carbonate | 6.5 parts, |
| potassium feldspar | 16 parts, |
| a frit | 38 parts, |
| calcined alumina | 6 parts, |
| calcined talc | 11 parts, |
| dolomite | 2 parts, |
| kaolin | 6.5 parts, |
| an ultrafine quartz powder | 1.5 parts. |

The frit consisted of the following chemical components:

| $SiO_2$ | 45.5% | $Al_2O_3$ | 19.5% | $Fe_2O_3$ | 0.08% | CaO | 2.50% |
|---|---|---|---|---|---|---|---|
| MgO | 0.95% | $K_2O$ | 1.9% | $Na_2O$ | 4.6% | $TiO_2$ | 0.22% |
| $B_2O_3$ | 0.05% | BaO | 15.1% | ZnO | 6.1% | SrO | 3.5%. |

The ceramic tile decorated with dry particles prepared by the method above, wherein the ceramic tile decorated with the dry particles comprises, from bottom to top, a green body layer, a ground coat layer, a pattern layer, a dry particle layer, and a protective glaze layer; a thickness of the ground coat layer was 0.05-0.2 mm, a thickness of the pattern layer was 0.05-0.1 mm, a thickness of the dry particle layer was 0.5-1 mm, and a thickness of the protective glaze layer was 0.02-0.03 mm.

EXAMPLE 3

A method for manufacturing a ceramic tile decorated with dry particles to give a three-dimensional pattern, wherein the method comprised the steps of
A: glazing a surface of a green body with a ground coat;
B: maintaining a temperature of the green body at 50° C. after the green body was glazed with the ground coat of step A; then, decorating a surface of the ground coat of the green body to form a pattern;

C: drying the green body after the green body was decorated with the pattern of step B;
D: embellishing the green body with dry particles by spreading the dry particles on the surface of the green body after the drying of step C;
E: spraying a protective glaze on the surface of the green body after embellished with the dry particles of step D; and
F: firing the green body after the green body was sprayed with the protective glaze of step E to produce the ceramic tile decorated with dry particles.

Before step A, the green body was decorated with line textures by means of a digital material distribution method using mechanical arms.

In step A, the ground coat consisted of the following chemical components:

| $SiO_2$ | 65.3% | $Al_2O_3$ | 20% | $Fe_2O_3$ | 0.12% | CaO | 1.28% |
|---|---|---|---|---|---|---|---|
| MgO | 0.64% | $K_2O$ | 2.2% | $Na_2O$ | 3.21% | $TiO_2$ | 0.10% |
| $ZrO_2$ | 1.35% | BaO | 4.85% | ZnO | 0.95%. | | |

In step C, the drying of the green body after the green body was decorated with the pattern was carried out at a temperature of 135° C.; wherein in step E, the spraying of the protective glaze was carried out by high-pressure spraying, a pressure of the high-pres sure spraying of the protective glaze was 15 bar, an amount of the protective glaze sprayed was 85 g/m²; wherein in step F, the firing was carried out at 1200° C. for 70 min.

The protective glaze in step E was a matte transparent protective glaze, the matte transparent protective glaze comprised the following raw materials in parts by weight:

| calcined zinc oxide | 5.5 parts, |
|---|---|
| barium carbonate | 7 parts, |
| potassium feldspar | 18 parts, |
| a frit | 40 parts, |
| calcined alumina | 8 parts, |
| calcined talc | 12 parts, |
| dolomite | 3 parts, |
| kaolin | 7 parts, |
| an ultrafine quartz powder | 2 parts. |

The frit consisted of the following chemical components

| $SiO_2$ | 45.5% | $Al_2O_3$ | 19.5% | $Fe_2O_3$ | 0.05% | CaO | 2.40% |
|---|---|---|---|---|---|---|---|
| MgO | 0.80% | $K_2O$ | 1.91% | $Na_2O$ | 4.67% | $TiO_2$ | 0.25% |
| $B_2O_3$ | 0.06% | BaO | 15.16% | ZnO | 6.2% | SrO | 3.5% |

The ceramic tile decorated with dry particles prepared by the method above, wherein the ceramic tile decorated with the dry particles comprised, from bottom to top, a green body layer, a ground coat layer, a pattern layer, a dry particle layer, and a protective glaze layer; a thickness of the ground coat layer was 0.05-0.2 mm, a thickness of the pattern layer was 0.05-0.1 mm, a thickness of the dry particle layer was 0.5-1 mm, and a thickness of the protective glaze layer was 0.02-0.03 mm.

EXAMPLE 4

A method for manufacturing a ceramic tile decorated with dry particles to give a three-dimensional pattern, wherein the method comprised the steps of
A: glazing a surface of a green body with a ground coat;
B: maintaining a temperature of the green body at 55° C. after the green body was glazed with the ground coat of step A; then, decorating a surface of the ground coat of the green body to form a pattern;
C: drying the green body after the green body was decorated with the pattern of step B;
D: embellishing the green body with dry particles by spreading the dry particles on the surface of the green body after the drying of step C;
E: spraying a protective glaze on the surface of the green body after embellished with the dry particles of step D; and
F: firing the green body after the green body was sprayed with the protective glaze of step E to produce the ceramic tile decorated with dry particles.

Before step A, the green body was decorated with line textures by means of a digital material distribution method using mechanical arms.

In step A, the ground coat consisted of the following chemical components:

| $SiO_2$ | 66% | $Al_2O_3$ | 19% | $Fe_2O_3$ | 0.10% | CaO | 1.28% |
|---|---|---|---|---|---|---|---|
| MgO | 0.68% | $K_2O$ | 2.0% | $Na_2O$ | 3.20% | $TiO_2$ | 0.11% |
| $ZrO_2$ | 1.8% | BaO | 4.85% | ZnO | 0.98%. | | |

In step C, the drying of the green body after the green body was decorated with the pattern was carried out at a temperature of 140° C.; wherein in step E, the spraying of the protective glaze was carried out by high-pressure spraying, a pressure of the high-pressure spraying of the protective glaze was 18 bar, an amount of the protective glaze sprayed was 90 g/m²; wherein in step F, the firing was carried out at 1210° C. for 65 min.

The protective glaze in step E was a matte transparent protective glaze, the matte transparent protective glaze comprised the following raw materials in parts by weight:

| calcined zinc oxide | 5.8 parts, |
|---|---|
| barium carbonate | 7.5 parts, |
| potassium feldspar | 19 parts, |
| a frit | 43 parts, |
| calcined alumina | 9 parts, |
| calcined talc | 13 parts, |
| dolomite | 4 parts, |
| kaolin | 7.5 parts, |
| an ultrafine quartz powder | 2.5 parts. |

The frit consisted of the following chemical components:

| $SiO_2$ | 45.5% | $Al_2O_3$ | 19% | $Fe_2O_3$ | 0.06% | CaO | 2.50% |
|---|---|---|---|---|---|---|---|
| MgO | 1.00% | $K_2O$ | 1.85% | $Na_2O$ | 4.6% | $TiO_2$ | 0.25% |
| $B_2O_3$ | 0.04% | BaO | 15.3% | ZnO | 6.3% | SrO | 3.6%. |

The ceramic tile decorated with dry particles prepared by the method above, wherein the ceramic tile decorated with the dry particles comprised, from bottom to top, a green body layer, a ground coat layer, a pattern layer, a dry particle layer, and a protective glaze layer; a thickness of the ground coat layer was 0.05-0.2 mm, a thickness of the pattern layer was 0.05-0.1 mm, a thickness of the dry particle layer was 0.5-1 mm, and a thickness of the protective glaze layer was 0.02-0.03 mm.

EXAMPLE 5

A method for manufacturing a ceramic tile decorated with dry particles to give a three-dimensional pattern, wherein the method comprised the steps of
A: glazing a surface of a green body with a ground coat;
B: maintaining a temperature of the green body at 60° C. after the green body was glazed with the ground coat of step A; then, decorating a surface of the ground coat of the green body to form a pattern;
- C: drying the green body after the green body was decorated with the pattern of step B;
- D: embellishing the green body with dry particles by spreading the dry particles on the surface of the green body after the drying of step C;
- E: spraying a protective glaze on the surface of the green body after embellished with the dry particles of step D; and
- F: firing the green body after the green body was sprayed with the protective glaze of step E to produce the ceramic tile decorated with dry particles.

Before step A, the green body was decorated with line textures by means of a digital material distribution method using mechanical arms.

In step A, the ground coat consisted of the foil chemical components:

| $SiO_2$ | 68% | $Al_2O_3$ | 18% | $Fe_2O_3$ | 0.15% | CaO | 1.35% |
| MgO | 0.7% | $K_2O$ | 2.47% | $Na_2O$ | 3.35% | $TiO_2$ | 0.12% |
| BaO | 4.90% | ZnO | 0.96%. | | | | |

In step C, the drying of the green body after the green body was decorated with the pattern was carried out at a temperature of 150° C.; wherein in step E, the spraying of the protective glaze was carried out by high-pressure spraying, a pressure of the high-pressure spraying of the protective glaze was 20 bar, an amount of the protective glaze sprayed was 100 g/m²; wherein in step F, the firing was carried out at 1220° C. for 60 min.

The protective glaze in step E was a matte transparent protective glaze, the matte transparent protective glaze comprised the following raw materials in parts by weight:

| calcined zinc oxide | 6 parts, |
| barium carbonate | 8 parts, |
| potassium feldspar | 20 parts |
| a frit | 45 parts, |
| calcined alumina | 10 parts, |
| calcined talc | 14 parts, |
| dolomite | 5 parts, |
| kaolin | 8 parts, |
| an ultrafine quartz powder | 3 parts. |

The frit consisted of the following chemical components

| $SiO_2$ | 46.5% | $Al_2O_3$ | 19% | $Fe_2O_3$ | 0.06% | CaO | 2.50% |
| MgO | 1.00% | $K_2O$ | 1.8% | $Na_2O$ | 4.5% | $TiO_2$ | 0.2% |
| $B_2O_3$ | 0.04% | BaO | 15.0% | ZnO | 6.0% | SrO | 3.4%. |

The ceramic tile decorated with dry particles prepared by the method above, wherein the ceramic tile decorated with the dry particles comprised, from bottom to top, a green body layer, a ground coat layer, a pattern layer, a dry particle layer, and a protective glaze layer; a thickness of the ground coat layer was 0.05-0.2 mm, a thickness of the pattern layer was 0.05-0.1 mm, a thickness of the dry particle layer was 0.5-1 mm, and a thickness of the protective glaze layer was 0.02-0.03 mm.

EXAMPLE 6

The difference between this example and example 1 above lay in:
Step D specifically included the following steps:
- D1: following the drying of step C, spraying a wetting agent solution on a pattern-decorated surface of the green body;
- D2: spraying glue on the pattern-decorated surface of the green body after the pattern-decorated surface was sprayed with the wetting agent solution in step D1;
- D3: spreading dry particles on the surface of the green body after the pattern-decorated surface was sprayed with the glue in step D2; and
- D4: recycling the dry particles under suction, wherein the dry particles recycled were the dry particles that were not held by the glue during the spreading of the dry particles in step D3.

Before step E, step D2 to step D4 were repeated 2-6 times.

In step D1, the spraying of the wetting agent was carried out by high-pressure spraying, a pressure of the high-pressure spraying was 10 bar; wherein in step D3, a quantity of the dry particles spread was 160 g/m², and a particle size of the dry particles was 60 mesh.

In step D1, the wetting agent solution was prepared by mixing an eco-friendly wetting agent and room temperature water at a weight ratio of 20:80, the eco-friendly wetting agent was a mixture of an eco-friendly wetting powder and hot water at a weight ratio of 1:10, the hot water was at 50° C.; the eco-friendly wetting powder comprised the following raw materials in parts by weight:

| polyvinyl alcohol | 15 parts, |
| acrylamide crystal | 5 parts, |
| sodium carboxymethylcellulose | 50 parts, |
| carbopol | 5 parts. |

The ceramic tile decorated with dry particles prepared by the method above, wherein the ceramic tile decorated with the dry particles comprised, from bottom to top, a green body layer, a ground coat layer, a pattern layer, a dry particle layer, and a protective glaze layer; a thickness of the ground coat layer was 0.05-0.2 mm, a thickness of the pattern layer was 0.05-0.1 mm, a thickness of the dry particle layer was 0.5-1 mm, and a thickness of the protective glaze layer was 0.02-0.03 mm.

EXAMPLE 7

The difference between this example and example 2 above lay in:
Step D specifically included the following steps:
- D1: following the drying of step C, spraying a wetting agent solution on a pattern-decorated surface of the green body;
- D2: spraying glue on the pattern-decorated surface of the green body after the pattern-decorated surface was sprayed with the wetting agent solution in step D1;
- D3: spreading dry particles on the surface of the green body after the pattern-decorated surface was sprayed with the glue in step D2; and
- D4: recycling the dry particles under suction, wherein the dry particles recycled were the dry particles that were not held by the glue during the spreading of the dry particles in step D3.

Before step E, step D2 to step D4 were repeated 2-6 times.

In step D1, the spraying of the wetting agent was carried out by high-pressure spraying, a pressure of the high-pressure spraying was 12 bar; wherein in step D3, a quantity of the dry particles spread was 270 g/m², and a particle size of the dry particles was 110 mesh.

In step C, the wetting agent solution was prepared by mixing an eco-friendly wetting agent and room temperature water at a weight ratio of 30:100, the eco-friendly wetting agent was a mixture of an eco-friendly wetting powder and hot water at a weight ratio of 1:9, the hot water was at 55° C.; the eco-friendly wetting powder comprised the following raw materials in parts by weight:

| polyvinyl alcohol | 18 parts, |
|---|---|
| acrylamide crystal | 6 parts, |
| sodium carboxymethylcellulose | 55 parts, |
| carbopol | 8 parts. |

The ceramic tile decorated with dry particles prepared by the method above, wherein the ceramic tile decorated with the dry particles comprised, from bottom to top, a green body layer, a ground coat layer, a pattern layer, a dry particle layer, and a protective glaze layer; a thickness of the ground coat layer was 0.05-0.2 mm, a thickness of the pattern layer was 0.05-0.1 mm, a thickness of the dry particle layer was 0.5-1 mm, and a thickness of the protective glaze layer was 0.02-0.03 mm.

EXAMPLE 8

The difference between this example and example 3 above lay in:

Step D specifically included the following steps:
D1: following the drying of step C, spraying a wetting agent solution on a pattern-decorated surface of the green body;
D2: spraying glue on the pattern-decorated surface of the green body after the pattern-decorated surface was sprayed with the wetting agent solution in step D1;
D3: spreading dry particles on the surface of the green body after the pattern-decorated surface was sprayed with the glue in step D2; and
D4: recycling the dry particles under suction, wherein the dry particles recycled were the dry particles that were not held by the glue during the spreading of the dry particles in step D3.

Before step E, step D2 to step D4 were repeated 2-6 times.

In step D1, the spraying of the wetting agent was carried out by high-pressure spraying, a pressure of the high-pressure spraying was 15 bar; wherein in step D3, a quantity of the dry particles spread was 380 g/m², and a particle size of the dry particles was 160 mesh.

In step D1, the wetting agent solution was prepared by mixing an eco-friendly wetting agent and room temperature water at a weight ratio of 35:65, the eco-friendly wetting agent was a mixture of an eco-friendly wetting powder and hot water at a weight ratio of 1:8, the hot water was at 60° C.; the eco-friendly wetting powder comprised the following raw materials in parts by weight:

| polyvinyl alcohol | 23 parts, |
|---|---|
| acrylamide crystal | 8 parts, |
| sodium carboxymethylcellulose | 60 parts, |
| carbopol | 10 parts. |

The ceramic tile decorated with dry particles prepared by the method above, wherein the ceramic tile decorated with the dry particles comprised, from bottom to top, a green body layer, a ground coat layer, a pattern layer, a dry particle layer, and a protective glaze layer; a thickness of the ground coat layer was 0.05-0.2 mm, a thickness of the pattern layer was 0.05-0.1 mm, a thickness of the dry particle layer was 0.5-1 mm, and a thickness of the protective glaze layer was 0.02-0.03 mm.

EXAMPLE 9

The difference between this example and example 4 above lay in:

Step D specifically included the following steps:
D1: following the drying of step C, spraying a wetting agent solution on a pattern-decorated surface of the green body;
D2: spraying glue on the pattern-decorated surface of the green body after the pattern-decorated surface was sprayed with the wetting agent solution in step D1;
D3: spreading dry particles on the surface of the green body after the pattern-decorated surface was sprayed with the glue in step D2; and
D4: recycling the dry particles under suction, wherein the dry particles recycled were the dry particles that were not held by the glue during the spreading of the dry particles in step D3.

Before step E, step D2 to step D4 were repeated 2-6 times.

In step D1, the spraying of the wetting agent was carried out by high-pressure spraying, a pressure of the high-pressure spraying was 18 bar; wherein in step D3, a quantity of the dry particles spread was 490 g/m², and a particle size of the dry particles was 210 mesh.

In step D1, the wetting agent solution was prepared by mixing an eco-friendly wetting agent and room temperature water at a weight ratio of 40:100, the eco-friendly wetting agent was a mixture of an eco-friendly wetting powder and hot water at a weight ratio of 1:8, the hot water was at 65° C.; the eco-friendly wetting powder comprised the following raw materials in parts by weight:

| polyvinyl alcohol | 27 parts, |
|---|---|
| acrylamide crystal | 9 parts, |
| sodium carboxymethylcellulose | 65 parts, |
| carbopol | 13 parts. |

The ceramic tile decorated with dry particles prepared by the method above, wherein the ceramic tile decorated with the dry particles comprised, from bottom to top, a green body layer, a ground coat layer, a pattern layer, a dry particle layer, and a protective glaze layer; a thickness of the ground coat layer was 0.05-0.2 mm, a thickness of the pattern layer was 0.05-0.1 mm, a thickness of the dry particle layer was 0.5-1 mm, and a thickness of the protective glaze layer was 0.02-0.03 mm.

EXAMPLE 10

The difference between this example and example 5 above lay in:

Step D specifically included the following steps:
D1: following the drying of step C, spraying a wetting agent solution on a pattern-decorated surface of the green body;
D2: spraying glue on the pattern-decorated surface of the green body after the pattern-decorated surface was sprayed with the wetting agent solution in step D1;

D3: spreading dry particles on the surface of the green body after the pattern-decorated surface was sprayed with the glue in step D2; and D4: recycling the dry particles under suction, wherein the dry particles recycled were the dry particles that were not held by the glue during the spreading of the dry particles in step D3.

Before step E, step D2 to step D4 were repeated 2-6 times.

In step D1, the spraying of the wetting agent was carried out by high-pressure spraying, a pressure of the high-pressure spraying was 20 bar; wherein in step D3, a quantity of the dry particles spread was 600 g/m², and a particle size of the dry particles was 250 mesh.

In step D1, the wetting agent solution was prepared by mixing an eco-friendly wetting agent and room temperature water at a weight ratio of 50:50, the eco-friendly wetting agent was a mixture of an eco-friendly wetting powder and hot water at a weight ratio of 1:7, the hot water was at 70° C.; the eco-friendly wetting powder comprised the following raw materials in parts by weight:

| | |
|---|---|
| polyvinyl alcohol | 30 parts, |
| acrylamide crystal | 10 parts, |
| sodium carboxymethylcellulose | 70 parts, |
| carbopol | 15 parts. |

The ceramic tile decorated with dry particles prepared by the method above, wherein the ceramic tile decorated with the dry particles comprised, from bottom to top, a green body layer, a ground coat layer, a pattern layer, a dry particle layer, and a protective glaze layer; a thickness of the ground coat layer was 0.05-0.2 mm, a thickness of the pattern layer was 0.05-0.1 mm, a thickness of the dry particle layer was 0.5-1 mm, and a thickness of the protective glaze layer was 0.02-0.03 mm.

EXAMPLE 11

See FIG. 1, the manufacturing equipment of the ceramic tile decorated with dry particles used in the method above for manufacturing the ceramic tile decorated with the dry particles to give a three-dimensional pattern comprises, according to an order of use, a ground coat decorating device 1, a pattern decorating device 2, a drying device 3, a first high-pressure glaze spraying device 4, a multi-channel digital glue spraying device 5, a dry particle distributing device 6, a particle suction device 7, a second high-pressure glaze spraying device 8, and a firing device 9. The particle suction device 7 comprises a firing output terminal and a circulation output terminal, the firing output terminal is connected to an input terminal of the firing device 9, and the circulation output terminal is connected to an input terminal of the multi-channel digital glue spraying device 5. The first high-pressure glaze spraying device 4 and the second high-pressure glaze spraying device 8 are both equipped with a high-pressure spray gun.

Figure 2:
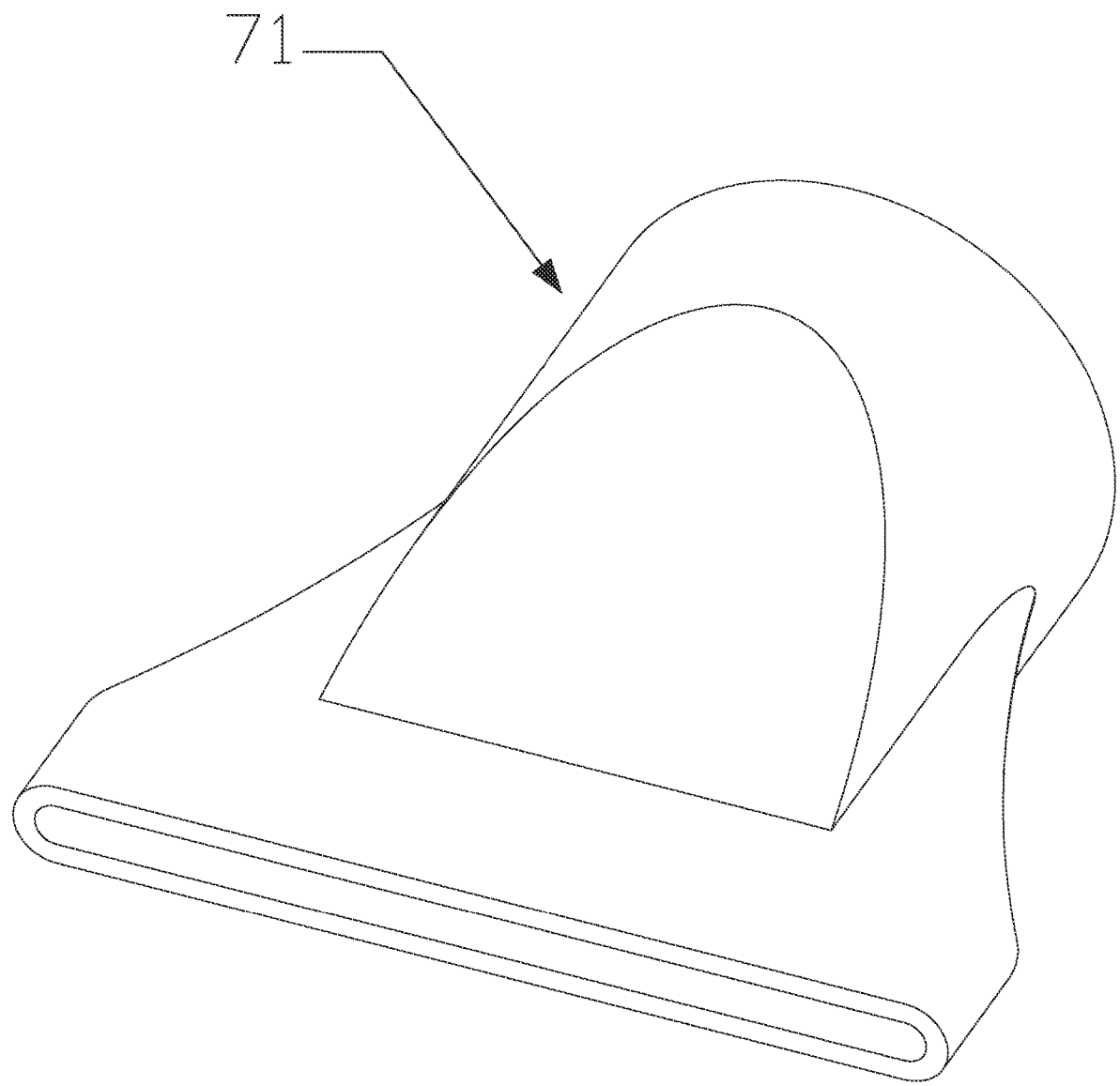
FIG. 2 is a structure diagram of the dry particle suction device of the present disclosure.

See FIG. 2, the particle suction device 7 comprises a dry particle suction device 71, a hose 73 and a filtering device 74 connected in sequence. The particle suction device 7 also includes a suction adjusting device 72 used to adjust the suction force of the dry particles, a hot air output device 76 used to deliver hot air to soften glue that suctions away the surface of the dry particles, and a negative pressure vacuum device 75 for forming a negative pressure on the particle suction device. An input terminal of the hot air output device 76 is connected to an input terminal of a filtering device 74; the dry particle suction device 71 is a fan-shaped dry particle suction device with a slit-shaped dry particle suction port.

Comparative Example 1 (Using a Common Process of Coating Glue—Spreading Dry Particles)

A method for manufacturing a ceramic tile decorated with dry particles, wherein the method comprised the steps of A: glazing a surface of a green body with a ground coat;

B: maintaining a temperature of the green body at 50° C. after the green body was glazed with the ground coat of step A; then, decorating a surface of the ground coat of the green body to form a pattern;

C: drying the green body after the green body was decorated with the pattern of step B;

D: spraying glue on the surface of the green body after the drying of step C;

E: embellishing the green body with dry particles by spreading dry particles on the surface of the green body after the surface was sprayed with the glue of step D; and F: firing the green body after the green body was decorated with the dry particles of step E to produce the ceramic tile decorated with dry particles.

Before step A, the green body was decorated with line textures by means of a digital material distribution method using mechanical arms.

In step A, the ground coat consisted of the following chemical components

| | | | | | | | |
|---|---|---|---|---|---|---|---|
| SiO₂ | 65.3% | Al₂O₃ | 20% | Fe₂O₃ | 0.12% | CaO | 1.28% |
| MgO | 0.64% | K₂O | 2.2% | Na₂O | 3.21% | TiO₂ | 0.10% |
| ZrO₂ | 1.35% | BaO | 4.85% | ZnO | 0.95%. | | |

In step C, the drying of the green body after the green body was decorated with the pattern was carried out at a temperature of 135° C.; wherein in step F, the firing was carried out at 1200° C. for 70 min.

Comparative Example 2 (on the Basis of Example 8, Using a Common Process of Coating Glue—Spreading Dry Particles, without the Wetting Agent, with the Protective Glaze)

A method for manufacturing a ceramic tile decorated with dry particles to give a three-dimensional pattern, wherein the method comprised the steps of A: glazing a surface of a green body with a ground coat;

B: maintaining a temperature of the green body at 50° C. after the green body was glazed with the ground coat of step A; then, decorating a surface of the ground coat of the green body to form a pattern;

C: drying the green body after the green body was decorated with the pattern of step B;

D: embellishing the green body with dry particles by steps of

D1: following the drying of step C, spraying glue on the pattern-decorated surface of the green body;

D2: spreading dry particles on the surface of the green body after the pattern-decorated surface was sprayed with the glue in step D1; and D3: recycling the dry particles under suction, wherein the dry particles recycled were the dry particles that were not held by the glue during the spreading of the dry particles in step D2.

E: spraying a protective glaze on the surface of the green body after embellished with the dry particles of step D; and F: firing the green body after the green body was sprayed with the protective glaze of step E to produce the ceramic tile decorated with dry particles to give a three-dimensional pattern.

Before step A, the green body was decorated with line textures by means of a digital material distribution method using mechanical arms.

Before step E, step D2 to step D4 were repeated 2-6 times.

In step A, the ground coat consisted of the following chemical components:

| SiO$_2$ | 65.3% | Al$_2$O$_3$ | 20% | Fe$_2$O$_3$ | 0.12% | CaO | 1.28% |
|---|---|---|---|---|---|---|---|
| MgO | 0.64% | K$_2$O | 2.2% | Na$_2$O | 3.21% | TiO$_2$ | 0.10% |
| ZrO$_2$ | 1.35% | BaO | 4.85% | ZnO | 0.95%. | | |

In step C, the drying of the green body after the green body was decorated with the pattern was carried out at a temperature of 135° C.; wherein in step D2, a quantity of the dry particles spread is 160 g/m², and a particle size of the dry particles is 160 mesh; wherein in step E, the spraying of the protective glaze was carried out by high-pressure spraying, a pressure of the high-pressure spraying of the protective glaze was 15 bar, an amount of the protective glaze sprayed was 85 g/m²; wherein in step F, the firing was carried out at 1200° C. for 70 min.

The protective glaze in step E was a matte transparent protective glaze, the matte transparent protective glaze comprised the following raw materials in parts by weight:

| calcined zinc oxide | 5.5 parts, |
|---|---|
| barium carbonate | 7 parts, |
| potassium feldspar | 18 parts, |
| a frit | 40 parts, |
| calcined alumina | 8 parts, |
| calcined talc | 12 parts, |
| dolomite | 3 parts, |
| kaolin | 7 parts, |
| an ultrafine quartz powder | 2 parts. |

The frit consisted of the following chemical components:

| SiO$_2$ | 45.50% | Al$_2$O$_3$ | 19.5% | Fe$_2$O$_3$ | 0.05% | CaO | 2.40% |
|---|---|---|---|---|---|---|---|
| MgO | 0.80% | K$_2$O | 1.91% | Na$_2$O | 4.67% | TiO$_2$ | 0.25% |
| B$_2$O$_3$ | 0.06% | BaO | 15.16% | ZnO | 6.2% | SrO | 3.5%. |

The ceramic tile decorated with dry particles prepared by the method above, wherein the ceramic tile decorated with the dry particles comprised, from bottom to top, a green body layer, a ground coat layer, a pattern layer, a glue layer, a dry particle layer, and a protective glaze layer; a thickness of the ground coat layer was 0.05-0.2 mm, a thickness of the pattern layer was 0.05-0.1 mm, a thickness of the glue layer was 0.02-0.03 mm, a thickness of the dry particle layer was 0.2-0.3 mm, and a thickness of the protective glaze layer was 0.02-0.03 mm.

Comparative Example 3 (on the Basis of Example 3, without the Protective Glaze)

A method for manufacturing a ceramic tile decorated with dry particles to give a three-dimensional pattern, wherein the method comprised the steps of A: glazing a surface of a green body with a ground coat;

B: maintaining a temperature of the green body at 50° C. after the green body was glazed with the ground coat of step A; then, decorating a surface of the ground coat of the green body to form a pattern;

C: drying the green body after the green body was decorated with the pattern of step B;

D: embellishing the green body with dry particles by steps of

D1: following the drying of step C, spraying a wetting agent solution on a pattern-decorated surface of the green body;

D2: spraying glue on the pattern-decorated surface of the green body after the pattern-decorated surface was sprayed with the wetting agent solution in step D1;

D3: spreading dry particles on the surface of the green body after the pattern-decorated surface was sprayed with the glue in step D2;

D4: recycling the dry particles under suction, wherein the dry particles recycled were the dry particles that were not held by the glue during the spreading of the dry particles in step D3; and E: firing the green body after embellished with the dry particles of step D to produce the ceramic tile decorated with dry particles to give a three-dimensional pattern.

Before step A, the green body was decorated with line textures by means of a digital material distribution method using mechanical arms.

Before step E, step D2 to step D4 were repeated 2-6 times.

In step A, the ground coat consisted of the follow chemical components:

| SiO$_2$ | 65.3% | Al$_2$O$_3$ | 20% | Fe$_2$O$_3$ | 0.12% | CaO | 1.28% |
|---|---|---|---|---|---|---|---|
| MgO | 0.64% | K$_2$O | 2.2% | 3.21% | Na$_2$O | 0.10% | TiO$_2$ |
| ZrO$_2$ | 1.35% | BaO | 4.85% | ZnO | 0.95%. | | |

In step C, the drying of the green body after the green body was decorated with the pattern was carried out at a temperature of 135° C.; wherein in step E, the spraying of the protective glaze was carried out by high-pressure spraying, a pressure of the high-pres sure spraying of the protective glaze was 15 bar, an amount of the protective glaze sprayed was 85 g/m²; wherein in step F, the firing was carried out at 1200° C. for 70 min.

In step D1, the spraying of the wetting agent was carried out by high-pressure spraying, a pressure of the high-pressure spraying was 15 bar; wherein in step D3, a quantity of the dry particles spread was 380 g/m², and a particle size of the dry particles was 160 mesh.

In step D1, the wetting agent solution was prepared by mixing an eco-friendly wetting agent and room temperature water at a weight ratio of 35:65, the eco-friendly wetting agent was a mixture of an eco-friendly wetting powder and hot water at a weight ratio of 1:8, the hot water was at 60° C.; the eco-friendly wetting powder comprised the following raw materials in parts by weight:

| | |
|---|---|
| polyvinyl alcohol | 23 parts, |
| acrylamide crystal | 8 parts, |
| sodium carboxymethylcellulose | 60 parts, |
| carbopol | 10 parts. |

The protective glaze in step E was a matte transparent protective glaze, the matte transparent protective glaze comprised the following raw materials in parts by weight:

| | |
|---|---|
| calcined zinc oxide | 5.5 parts, |
| barium carbonate | 7 parts, |
| potassium feldspar | 18 parts, |
| a frit | 40 parts, |
| calcined alumina | 8 parts, |
| calcined talc | 12 parts, |
| dolomite | 3 parts, |
| kaolin | 7 parts, |
| an ultrafine quartz powder | 2 parts. |

The frit consisted of the following chemical components:

| | | | | | | | |
|---|---|---|---|---|---|---|---|
| $SiO_2$ | 45.50% | $Al_2O_3$ | 19.5% | $Fe_2O_3$ | 0.05% | CaO | 2.40% |
| MgO | 0.80% | $K_2O$ | 1.91% | $Na_2O$ | 4.67% | $TiO_2$ | 0.25% |
| $B_2O_3$ | 0.06% | BaO | 15.16% | ZnO | 6.2% | SrO | 3.5%. |

The ceramic tile decorated with dry particles prepared by the method above, wherein the ceramic tile decorated with the dry particles comprised, from bottom to top, a green body layer, a ground coat layer, a pattern layer, a glue layer, and a dry particle layer; a thickness of the ground coat layer was 0.05-0.2 mm, a thickness of the pattern layer was 0.05-0.1 mm, a thickness of the glue layer was 0.02-0.03 mm, and a thickness of the dry particle layer was 0.5-1 mm.

Comparative Example 4 (the Protective Glaze was a Conventional Protective Glaze that was Commercially Available)

The difference between this example and the example 3 above lay in:
In step E, the protective glaze was a conventional protective glaze that was commercially available.

The ceramic tiles decorated with dry particles prepared in examples 1-10 above and comparative examples 1-4 were tested for properties such as hardness, wear resistance, glossiness, and interlayer adhesion. The test results were as follows:

| | Mohs hardness | Grade of wear resistance | Glossiness | Adhesion grade of dry particle layer |
|---|---|---|---|---|
| Example 1 | >7 | 4 | 8 | 0 |
| Example 2 | >7 | 4 | 7 | 0 |
| Example 3 | >7 | 5 | 5 | 0 |
| Example 4 | >7 | 4 | 6 | 0 |
| Example 5 | >7 | 4 | 8 | 0 |
| Example 6 | >7 | 4 | 7 | 0 |
| Example 7 | >7 | 4 | 6 | 0 |
| Example 8 | >7 | 5 | 5 | 0 |
| Example 9 | >7 | 4 | 6 | 0 |
| Example 10 | >7 | 4 | 7 | 0 |
| Comparative example 1 | 6.0 | 2 | 12 | 2 |
| Comparative example 2 | 5.0 | 3 | 9 | 1 |
| Comparative example 3 | 6.0 | 2 | 11 | 1 |
| Comparative example 4 | 6.0 | 3 | 10 | 1 |

Wherein, the grade of wear resistance was tested according to a test method of GB/T 3810.7-2016 Standard, and the degree of surface wear traces of samples after grinding at a specific grinding speed was observed. The grade of wear resistance is divided into 0-5 grades, and specific grades are as follows:

| Grade | The number of grinding revolutions with visible abrasion |
|---|---|
| 0 | 100 |
| 1 | 150 |
| 2 | 600 |
| 3 | 750, 1500 |
| 4 | 2100, 6000, 12000 |
| 5 | >12000 |

The adhesion grade of the dry particle layer was tested according to a cross-cut test method of GB/T9286-98 Standard, and shedding of the dry particle layer of the test sample was observed. The adhesion grade of the dry particle layer is divided into 0-5 grades, and specific grades are as follows:

| Grade | Description of situation |
|---|---|
| 0 | Edges are completely smooth, and there is no shedding. |
| 1 | There is shedding at an intersection of the cross-cut incision and/or an edge of the incision, but the effect of the cross-cut area is obviously not more than 5%. |
| 2 | There is shedding at an intersection of the cross-cut incision and/or an edge of the incision; an affected cross-cut area is obviously larger than 5%, but obviously not larger than 15%. |
| 3 | Part or all of a cutting edge is peeled off as large pieces, and/or partly or completely peeled off on different parts of each; an affected cross-cut area is obviously larger than 15%, but obviously not larger than 35%. |

-continued

| Grade | Description of situation |
|---|---|
| 4 | There are large fragments falling off along the edge of the incision, and/or partial or complete shedding appears in some squares; an affected cross-cut area is obviously larger than 35%, but obviously not larger than 65%. |
| 5 | A peeling degree exceeds 4 grades. |

According to the test data above, the ceramic tiles made by the disclosure have clear patterns, distinct layers, low glaze glossiness, good non-slip effects, obvious senses of dry particles, strong three-dimensional effects, rich colors, high hardness, and high dry particle adhesion.

In comparative example 1, the common spreading process of dry particles on the market was adopted, and the dry particles were spread directly after the glue was spread on the green body. Compared with the ceramic tile prepared in each example of the present disclosure, the surface of the ceramic tile produced in comparative example 1 had lower wear resistance, a wear resistance grade of 2, lower dry particle adhesion, high glossiness (12°), lower slip resistance, a lower dry particle sense, and slightly lower hardness (6.0). This showed that, by spraying protective glaze after the dry particles were spread, then firing, or spraying the wetting agent and then spraying the glue, and then spreading the dry particles and spraying the protective glaze, through strict control of the sequence and process of each step condition, the present disclosure can make the green body of the ceramic tile and the dry particles form a stable bonding layer of body-particle-glaze. The ceramic tile of the present disclosure had an obvious sense of sand, an strong three-dimensional effect, a clear pattern, rich colors, high hardness, high adhesion of the dry particle layer, a difficulty of shedding, high surface wear resistance, low glossiness, and a good non-slip effect.

In comparative example 2, compared with Example 8, the glue was sprayed directly after the green body was dried, then the dry particles were spread and recovered, and finally the green body was fired after the protective glaze was sprayed. The surface of the ceramic tile produced had lower wear resistance, a wear resistance grade of 3, lower dry particle adhesion (grade 1), high glossiness (9°), lower slip resistance, a lower dry particle sense, and slightly lower hardness (5.0). This showed that the present disclosure can form a transparent wetting film on the surface of the glaze surface of the green body by spraying the wetting agent solution on the dried body, thereby increase the humidity of the product. Utilizing the hydrophilicity and lipophilicity of the wetting agent of the present disclosure, the subsequent glue is easier to be sprayed on the glaze, the adhesion of the glue on the glaze is improved, and the oily ink and glue on the glaze are prevented from being affected by the phenomenon of avoiding the glaze. This will affect the dispersion and stability of the subsequent bonding of dry particles to the surface of the green body. At the same time, by spraying the protective glaze, it can improve the wear resistance of the ceramic tile surface, reduce its glossiness, and have the effect of matte frosting; it can also make the green body of the ceramic tile and the dry particles form a stable bonding layer of body-particle-glaze, thereby the ceramic tile has an obvious sense of sand, an strong three-dimensional effect, a clear pattern, rich colors, high hardness, high adhesion of the dry particle layer, a difficulty of shedding, high surface wear resistance, low glossiness, and a good non-slip effect.

Compared with example 8, in comparative example 3, the protective glaze was not sprayed at the end of the process, and the ceramic tile produced had lower surface wear resistance, a wear resistance grade of 2, lower dry particle adhesion (Grade 1), high glossiness (11°), lower slip resistance, a lower dry particle sense, and slightly lower hardness (6.0). This showed that the present disclosure can spray the protective glaze on the surface of the dry particles evenly by spraying the protective glaze on the surface of the body after the dry particles was spread, and strictly controlling the spraying pressure and the amount of the protective glaze. It can protect the dry particles to ensure that the dry particles are not blown off or suctioned off during the kiln firing process, improve the adhesion of the dry particles on the surface of the green body, avoids causing the dry particles to adhere to the kiln wall or roof as a result of the dry particles being suctioned away, thereby preventing the product from ash contamination, limestone caves, pinholes, etc. At the same time, by spraying the protective glaze, it can improve the wear resistance of the ceramic tile surface, reduce its glossiness, and have the effect of matte frosting; it can also make the green body of the ceramic tile and the dry particles form a stable bonding layer of body-glue-particle-glaze, thereby the ceramic tile has an obvious sense of sand, an strong three-dimensional effect, a clear pattern, rich colors, high hardness, high adhesion of the dry particle layer, a difficulty of shedding, high surface wear resistance, low glossiness, and a good non-slip effect.

Compared with example 3, in comparative Example 4, the protective glaze used in the process was a commercially available conventional protective glaze instead of the raw material formula of the protective glaze of the present disclosure; the ceramic tile produced had lower surface wear resistance, a wear resistance grade of 3, lower dry particle adhesion (Grade 1), high glossiness (10°), lower slip resistance, a lower dry particle sense, and slightly lower hardness (6.0). This showed that spraying the protective glaze can protect the dry particles to ensure that the dry particles are not blown off or suctioned off during the kiln firing process, improve the adhesion of the dry particles on the surface of the green body, avoids causing the dry particles to adhere to the kiln wall or roof due to the dry particles being suctioned away, thereby preventing the product from ash contamination, limestone caves, pinholes, etc. At the same time, by spraying the protective glaze, it can improve the wear resistance of the ceramic tile surface, reduce its glossiness, and have the effect of matte frosting; it can also make the green body of the ceramic tile and the dry particles form a stable bonding layer of body-glue-particle-glaze, thereby the ceramic tile has an obvious sense of sand, an strong three-dimensional effect, a clear pattern, rich colors, high hardness, high adhesion of the dry particle layer, a difficulty of shedding, high surface wear resistance, low glossiness, and a good non-slip effect.

The descriptions above are only the preferred examples of the present disclosure, and the specific examples above do not limit the present disclosure. Various variations and modifications can occur within the scope of the technical idea of the present disclosure; all embellishments, modifications or equivalent replacements made by those of ordinary skill in the art according to the descriptions above fall within the protection scope of the present disclosure.

What is claimed is:

1. A method for manufacturing a ceramic tile decorated with dry particles to give a three-dimensional pattern, wherein the method comprises the steps of A: glazing a surface of a green body with a ground coat;
B: maintaining a temperature of the green body at 40-60°
  C. after the green body is glazed with the ground coat of step A; then, decorating a surface of the ground coat of the green body to form a pattern;

C: drying the green body after the green body is decorated with the pattern of step B;

D: embellishing the green body with dry particles by spreading the dry particles on the surface of the green body after the drying of step C;

E: spraying a protective glaze on the surface of the green body after embellished with the dry particles of step D; and F: firing the green body after the green body is sprayed with the protective glaze of step E to produce the ceramic tile decorated with dry particles, wherein step D comprises steps of D1: following the drying of step C, spraying a wetting agent solution on a pattern-decorated surface of the green body;

D2: spraying glue on the pattern-decorated surface of the green body after the pattern-decorated surface is sprayed with the wetting agent solution in step D1;

D3: spreading dry particles on the surface of the green body after the pattern-decorated surface is sprayed with the glue in step D2; and D4: recycling the dry particles under suction, wherein the dry particles recycled are the dry particles that are not held by the glue during the spreading of the dry particles in step D3.

2. The method according to claim 1, wherein in step C, the drying of the green body after the green body is decorated with the pattern is carried out at a temperature of 120° C. to 150° C.; wherein in step E, the spraying of the protective glaze is carried out by high-pressure spraying, a pressure of the high-pressure spraying of the protective glaze is 10-20 bar, an amount of the protective glaze sprayed is 70-100 g/m2; wherein in step F, the firing is carried out at 1180-1220° C. for 60-80 min.

3. The method according to claim 1, wherein in step D1, the spraying of the wetting agent is carried out by high-pressure spraying, a pressure of the high-pressure spraying is 10-20 bar; wherein in step D3, a quantity of the dry particles spread is 160-600 g/m$^2$, and a particle size of the dry particles is 60-250 mesh.

4. The method according to claim 1, wherein in step D1, the wetting agent solution is prepared by mixing an eco-friendly wetting agent and room temperature water at a weight ratio of 20-50:50-80, the eco-friendly wetting agent is a mixture of an eco-friendly wetting powder and hot water at a weight ratio of 1:7-10, the hot water is at 50-70° C.; the eco-friendly wetting powder comprises the following raw materials in parts by weight:

| | |
|---|---|
| polyvinyl alcohol | 15-30 parts, |
| acrylamide crystal | 5-10 parts, |
| sodium carboxymethylcellulose | 50-70 parts, |
| carbopol | 5-15 parts. |

* * * * *